United States Patent [19]

Pike

[11] Patent Number: 4,480,088

[45] Date of Patent: Oct. 30, 1984

[54] WATER SOLUBLE POLYIMIDE RESIN SYSTEM

[75] Inventor: Roscoe A. Pike, Windsor, Conn.

[73] Assignee: United Technologies Corporation, Hartford, Conn.

[21] Appl. No.: 543,701

[22] Filed: Oct. 20, 1983

[51] Int. Cl.$^3$ ............................................. C08G 73/10
[52] U.S. Cl. ................................. 528/353; 524/600; 525/420; 525/436
[58] Field of Search ............... 528/353; 525/420, 436; 524/600

[56] References Cited

U.S. PATENT DOCUMENTS

| | | | |
|---|---|---|---|
| 3,448,068 | 6/1969 | Holub et al. | 260/29.2 |
| 3,766,117 | 10/1973 | McQuade | 260/29.2 N |
| 3,812,069 | 5/1974 | Boldebuck | 524/600 |
| 3,882,085 | 5/1975 | Schmitt et al. | 260/65 |
| 3,925,313 | 12/1975 | Kojima et al. | 260/47 CP |
| 3,936,404 | 2/1976 | Ishizuka et al. | 260/29.2 N |
| 4,053,444 | 10/1977 | Phillips | 524/600 |
| 4,065,420 | 12/1977 | Lupinski et al. | 524/600 |
| 4,073,788 | 2/1978 | Peterson | 260/29.2 N |
| 4,144,210 | 3/1979 | Noda et al. | 524/600 |
| 4,183,835 | 1/1980 | Yamaguchi et al. | 524/600 |
| 4,290,929 | 9/1981 | McGregor et al. | 260/29.2 N |
| 4,389,510 | 6/1983 | McGregor et al. | 528/353 |

Primary Examiner—Lester L. Lee
Attorney, Agent, or Firm—Alan C. Cohen

[57] ABSTRACT

The present invention is directed toward a process for making water soluble polyimide resin systems. The process comprises preparing a solution of a polyamic acid in an organic solvent, adding water to the solution to cause the polyamic acid to precipitate, filtering the precipitated acid, washing the precipitated acid with water to remove the organic solvent and then reacting the washed acid with a water soluble amine forming the water soluble amine salt of the polyamic acid. This polyamic acid salt may then be converted to the polyimide by heating. These water soluble polyamide systems allow for safer application of polyimide coatings to substrates.

5 Claims, No Drawings

WATER SOLUBLE POLYIMIDE RESIN SYSTEM

DESCRIPTION

1. Technical Field

The field of art to which this invention pertains is water soluble polyimide resin systems, more particularly, it relates to a process for forming water soluble, imidizable, polyamic acid salts free from organic solvents.

2. Background Art

The preparations of high temperature polyimide resin systems is a complex chemical synthesis. Typically, these resin systems are prepared by reacting an anhydride of a tetracarboxylic acid with an amine in an organic solvent forming a polyamic acid. This polyamic acid solution is then applied to a substrate and heated. The heating converts the polyamic acid to a high temperature polyimide. An important feature of both the synthesis and application of the film is that considerable quantities of organic solvents are required for this process. Typical solvents which are used are n-methyl-pyrrolidone, diglyme, N,N-dimethyl acetamide and dimethylformamide. The impact of both cost of these organic solvents as well as environmental restrictions as to their use creates a need for a polyimide resin system which requires the use of less organic solvent, particularly in the application of the polyamic acid solution. A number of attempts have been made where water has been used to disperse the polyamic acid precursor, U.S. Pat. No. 3,766,117 or a co-solvent has been employed to aid in the synthesis of a water soluble polyimide precursor, U.S. Pat. No. 3,925,313 or as in one case to just add copious amounts of water diluting the organic solvent, U.S. Pat. No. 3,925,313. However, all of these systems still require the presence of an organic co-solvent to be present in the final resin system which is sold and applied as a coating. The presence of these organic solvents in the final solution creates more than just environmental hazards when used. Some of these solvents are hazardous and therefore, special expensive, shipping and storage containers must be used to prevent accidental spills or the like from occurring. Additionally, the fact that the resin system is stored in a solution makes it more costly to ship due to increased weight as well as bulk. What is truly needed in this art area is a polyimide resin system which, when prepared, can salvage the organic solvent required to prepare the resin precursor but which may be shipped in a dry, aqueous soluble form such that no organic solvents are required to apply or cure the precursor to form a polyimide film.

DISCLOSURE OF INVENTION

This invention provides a process for forming aqueous solutions of polyimide resin by precipitating the resin from its organic solvent as a polyamic acid through the addition of water, washing the precipitate free of the organic solvent, drying the resin and redissolving the resin in dilute ammonium hydroxide.

Further, the invention provides a process wherein the organic solvents used in the synthesis of the polyimide resin, may be reclaimed from the resin system and used again.

Still further, this invention provides a dry, aqueous soluble polyamic acid which is useful in the formation of polyimide films.

Even further, the invention provides an organic solvent free process for applying a polyimide film to a substrate.

BEST MODE FOR CARRYING OUT THE INVENTION

The present invention may be practiced with any resin system containing a polyamic acid which is capable of being converted to a polyimide. This polyamic acid is generally formed by reacting a tetracarboxylic acid with a diamine in the presence of an organic solvent. However, it may be more practical to purchase an existing polyimide resin system from the manufacturer. Generally, these systems come either as a raw resin which may be redissolved in a compatible organic solvent or they come already in solution. It matters not how the polyamic acid is generated in order to practice this invention. The polyamic acid is then precipitated from the organic solvent solution by the addition of the resin to water. The amount of water which is required is not critical, however, it has been found that approximately ten times the volume of the organic solvent is suitable. During the addition of the resin solution and following the addition of all the resin, the solution may be stirred, preferably with a high speed mixing device for generating shear type stresses in order to promote the precipitation of a fine powder form of the polyamic acid. The primary reason for using such a high speed mixing device and producing the fine powder is that when it is filtered, it is more easily washed free of the organic solvent than a more gelatinous or large particle precipitate. After the acid has been precipitated from the organic solvent, it is filtered and generally washed thoroughly with water removing any remnants of the organic solvent from the powder. The powder may now be dried to remove the water. The powder may later be redissolved using a dilute solution of substituted ammonium hydroxide, or substituted amines in water. It is not necessary to dry the resin after it has been cleansed of the organic solvent in order to dissolve it in the dilute ammoniacal solution. This polyamic acid solution may then be applied to a substrate which is to be coated using any conventional means, i.e. spraying, brushing, and dried to form the polyimide coating. The amount of ammonia or amine which is required will vary from resin to resin. Generally, a slight excess of ammonia or amine is deemed necessary. A simple titration, which would be known to those skilled in the art, may be used to determine how many free carboxyl groups are available in the acid and thereby determine how much ammonia or amine is required to solubilize the polyamic acid. A number of water soluble amines which may be used to practice this invention are, but are not limited to, listed in Table I.

TABLE I 2-dimethylamino-2-methyl-1-propanol (DMAMP)
N,N-diethylethanol amine
N,N-dimethylethanol amine (DMAE)
2-amino-2-methyl-1-propanol (AMP)
Triethanol amine
Triethyl amine
Morpholine The polyamic acid is then converted to the polyimide by heating with any desirable oven. Generally these polymers start to convert at temperatures about 120° C. and are completely imidized at about 300° C.

EXAMPLE I

A 24 weight percent solution of P. D. George Polyamide Imide resin was prepared in N-methyl pyrrolidone. This solution was then added slowly, over the course of a one-half hour period, to 3 liters of distilled water. During this addition the water was rapidly stirred using a Ross high speed mixer. Also during this addition, the water was at about room temperature. The resulting finely divided light brown precipitate was filtered, washed with 500 ml of water and dried at 120° C. in an air circulating oven. The acid number was 18.8 by titration. Twenty grams of the dried powder was added with stirring to 140 cc of water containing 10 g of N,N-dimethyl-ethanol amine. The resulting slurry was warmed to 50°-55° C. to give a dark brown solution.

EXAMPLE II

A water soluble resin was prepared from DuPont NR-150 B2 Polyimide in the following manner. To 500 cc of water was added slowly with stirring 100 cc of an N-methyl pyrrolidone solution of the polyimide precursor. A soft purple colored grease was obtained which was leached with water until the water wash was essentially colorless. Thirty-six grams of the washed grease was added to 110 ml of water containing 10 ml of ammonium hydroxide. The resin dissolved readily at room temperature. The precipitated grease was also vacuum dried at 50° C. to give a purplish colored friable solid. The solid was also soluble in the ammonium hydroxide solution.

After the polyamic acid has been solubilized in a dilute solution of substituted ammonia or amine, the water may be removed in any conventional manner, leaving a dry polyamic acid salt powder in crystalline form. This salt, which is water soluble, can be transported in dry form and simply redissolved in water by the end user prior to application.

Water soluble resin systems of the invention offer a number of advantages over those resin systems of the past. First, the present resin systems do not require the constant presence of organic solvents to solubilize them. These costly organic solvents are only necessary to prepare the basic polyimide resin, precursor after which the resin may be precipitated and the solvent recovered and recycled to prepare more resin. This would mean a large cost saving for the manufacturer. In addition, the fact that these organic solvents are recycled means that they would not as readily pass into the environment creating pollution and potential health hazards. Second, further significant savings may be realized to the manufacturer through lower shipping and packaging costs since the resin may be dried and then sent without the organic solvent. Shipping would also be safer and easier due to the many restrictions placed on the shipment in interstate commerce of organic liquids. Third, the application and use of these polyimide resin systems would be much safer and easier with an aqueous solvent as compared to an organic one. It would be safer for the individual using the material as well as to the environment.

Although this invention has been shown and described with respect to a preferred embodiment, it will be understood by those skilled in this art that various changes in form and detail thereof may be made without departing from the spirit and scope of the claimed invention.

I claim:

1. A process for producing an aqueous soluble polyimide precursor comprising:
   preparing a solution of a polyamic acid in an organic solvent;
   adding water to the solution to cause the polyamic acid to precipitate;
   filtering the precipitated acid;
   washing the precipitated acid with water to remove the organic solvent;
   adding the washed acid to an aqueous solution of a water soluble amine, wherein the water soluble amine is present in quantities at least sufficient to dissolve the polyamic acid,
   thus forming the water soluble amine salt of the polyamic acid.

2. The process of claim 1 wherein the water soluble amine is ammonium hydroxide.

3. The process of claim 1 wherein the washed precipitate is dried at about 100° C.

4. The process of claim 1 wherein the soluble amine is present in quantities sufficient to neutralize all available carboxyl groups of the acid.

5. A method of making a water soluble polyimide precursor comprising:
   preparing a solution of a polyamic acid in an organic solvent;
   adding water to the solution causing the polyamic acid to precipitate;
   filtering the precipitated acid;
   washing the precipitated acid with water to remove the organic solvent;
   adding the washed acid to an aqueous solution containing a mixture of an amine, ammonia, or mixtures thereof, wherein said amine, ammonia, substituted amine, or mixtures thereof are present in quantities at least sufficient to dissolve the polyamic acid,
   thus forming the water soluble amine salt of the polyamic acid, and
   removing the water from the dissolved acid leaving a water soluble, polyamic acid salt which forms a polyimide on exposure to heat.

* * * * *